United States Patent

[11] 3,575,490

[72] Inventor Elias Reisman
Orange, Calif.
[21] Appl. No. 719,618
[22] Filed Apr. 8, 1968
[45] Patented Apr. 20, 1971
[73] Assignee Philco-Ford Corporation
Philadelphia, Pa.

[54] OPTICAL SYSTEM FOR RANGING BY LASERS AND THE LIKE
10 Claims, 3 Drawing Figs.

[52] U.S. Cl. .................................................. 356/160,
350/163, 356/4, 356/106
[51] Int. Cl. .................................................. G02f 1/28
[50] Field of Search .................................................. 350/160,
163; 356/106; 356/4

[56] References Cited
UNITED STATES PATENTS
3,455,627 7/1969 Letter ........................... 350/160
3,470,492 9/1969 Soffer ........................... 331/94.5

Primary Examiner—Rodney D. Bennett, Jr.
Assistant Examiner—Joseph G. Baxter
Attorney—Carl H. Synnestvedt ABSTRACT: A light splitting and recombining system, protecting observers and apparatus from destructive effects of laser flashes. Light from two paths is combined differentially to reduce, by interference, the light transmitted by the system. In one of the paths there is included a light-bleachable optical element whose transmissivity is a function of incident light energy. The system accepts low energy light of all wavelengths, but substantially stops high energy laser light.

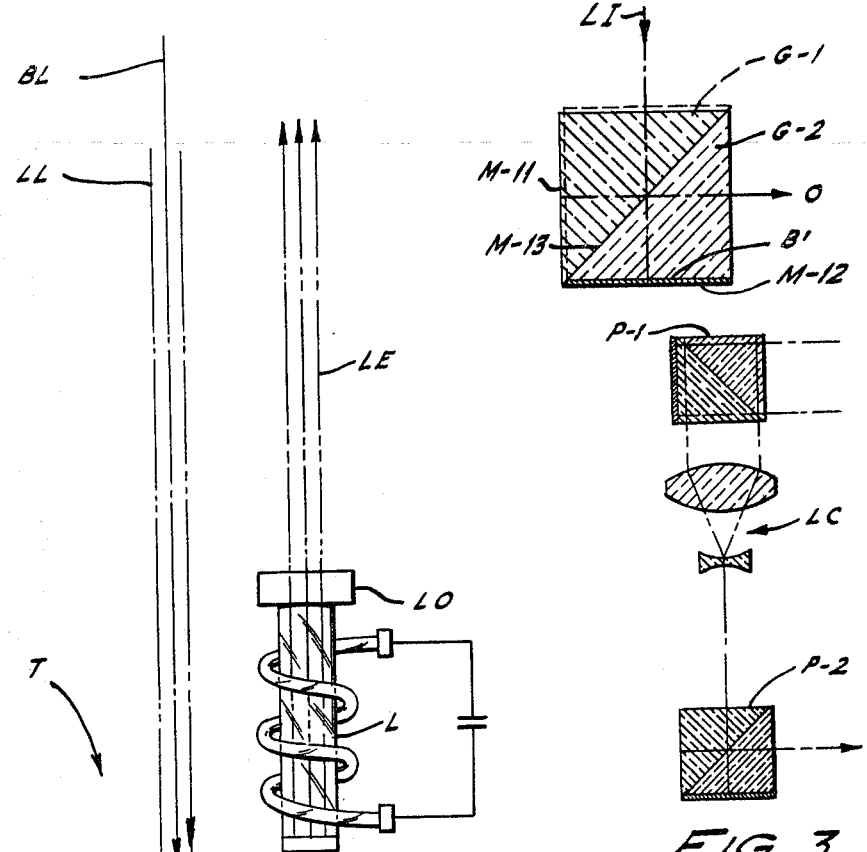
FIG. 2.
FIG. 3.
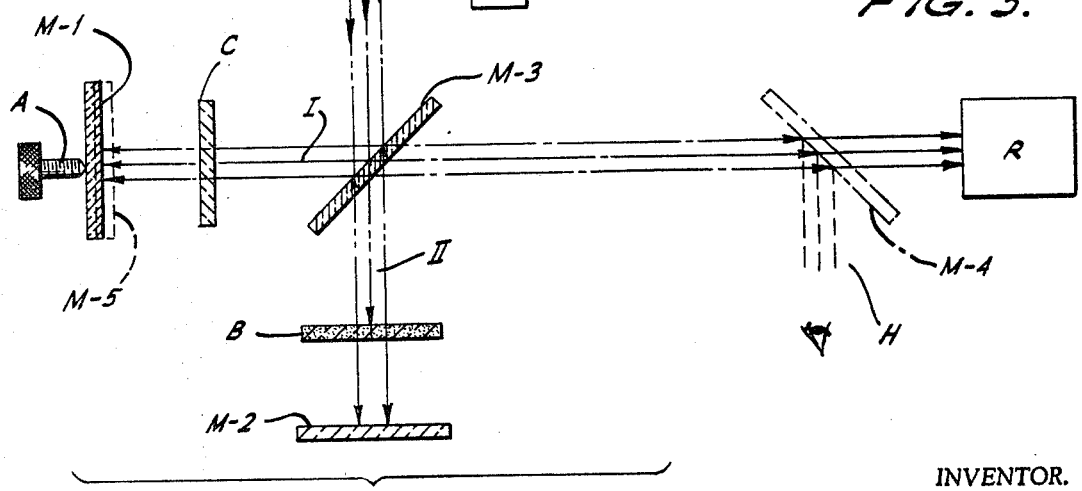
FIG. 1.
INVENTOR.
ELIAS REISMAN
BY
Frank D. Prager
ATTORNEY

OPTICAL SYSTEM FOR RANGING BY LASERS AND THE LIKE

In systems where laser light is used or encountered, for instance in the determination of distances by laser "ranging" methods, serious dangers are caused by possible flashes of enormously intense light, coming or returning from remote areas and which can enter an observer's eye, or a sensitive instrument, with irreparable harm. The perilous flashes can come from various sources, including not only remote lasers operated by others, for example by enemies, but also strong reflections of the user's own laser beam.

Heretofore it was proposed to counteract such dangers by using a narrow band filter. Particularly a filter rejecting light of 6,943 A wavelength could be used to avoid danger from ruby lasers. Such proposals had the drawback that they impaired the user's observation of his own operations, especially those carried out at the wavelength of the ranging instrument itself.

It has also been suggested to interpose material in the line of sight which would blacken or become opaque on exposure to high intensity light. These proposals also have various drawbacks, including relative slowness of the blackening process, as well as the danger of evaporation and loss of more rapidly blackening elements.

In contrast to these and similar proposals of the past, the invention uses a modified form of a light splitting, recombining and interference-inducing system, wherein it incorporates, in one of the several light paths, a known light bleachable element, not a light blackening element. Advantageously the transmissivity of the element is a function of incident light energy. The new combination, which will now be described, achieves in response to a laser flash an enormous reduction in system transmissivity, greatly exceeding the limited increase in transmissivity of the light bleachable element itself.

In the drawing appended hereto FIG. 1 is a schematic view of a simple embodiment of the new combination. FIGS. 2 and 3 are similar views, showing the principal components of a somewhat modified and preferred system.

Referring to FIG. 1, the ranging or "tracking" instrument T receives ordinary background light BL and may also receive laser light LL. In the instrument, the incident light enters a system which basically constitutes a Michelson interferometer, and wherein first and second mirrors M–1 and M–2 are at right angles to one another while an oblique glass mirror, installed to face both mirrors, has a semireflective surface M–3 at 45° to M–1 and M–2. Light BL, LL, incident on surface M–3, is split into beams I, II, advantageously of equal energy, which are directed to the two mirrors. By means of micrometer screw A, the distance from full reflector M–1 to oblique semireflective surface M–3 is adjusted to be such, by comparison with the distance from m–3 to the second full reflector M–2, that maximum interference occurs. In the simple embodiment shown, and when disregarding transmission times in M–3, B and C and phase shifts at M–1, M–2, this condition occurs if $D_1$ equals $D_2 \pm n \lambda 4$, where $\lambda$ is the wavelength of laser light LL, $n$ is an odd integer, and $D_1$, $D_2$ are, respectively, the center distances from M–3 to $M_1$ and $M_2$. By such adjustment the interferometer is optically tuned to the laser light, to obtain differential interference.

According to the invention a disc of light bleachable material B is disposed in light path II, between the semireflective surface and one of the mirrors, for instance as shown between M–2 and M–3. This material, which is also referred to as light fading, can for instance consist of the substance identified as "RG–10 glass," which comprises selenium and cadmium sulfide. It is made by Jena Glaswerk Schott & Gen., Mainz, Germany and is distributed by Fish-Schuman Corporation of New Rochelle, New York. Instead of this substance a solution of metal phthalocyanines can also be used. Both substances have the characteristic that their light transmission coefficient increases to some limited extent, with the intensity of the incident light, within fractions of a nanosecond, and that the variation is reversible and repeatable, as has been pointed out for instance by Georges Bret and Francois Gires, Comptes Rendus, Academie des Sciences, Vol. 259 pp. 3469 3471 (1964) and Applied Physics Letters, Vol. 4, pp. 175, 176 (1964). By means of the new combination of elements the limited increase in transmissivity of the elements leads to a much greater reduction of transmissivity of the total system.

Preferably, a compensator C for element B is disposed in light path I. This compensator can be a neutral density filter having a transmission equal to that which light bleachable disc B has in its state of maximum transmission. Substantially complete elimination of the danger caused by laser light can be achieved by this arrangement, while the utilization of nonlaser light, including light at laser wavelength, remains almost entirely undisturbed.

If the new instrument is utilized as part of a ranging device, it is rigidly connected with laser L, as is schematically suggested by the bracket interconnecting the several devices. For purposes of illustration FIG. 1 assumes that light LE, generated by laser L and collimated by laser optics LO, is projected to some distant object, not shown, and is reflected therefrom as light LL, shown on the left side of the FIG. This light is received in instrument T.

In this instrument, a ranging unit R, per se known in the art, and including for instance a well known photodiode and oscilloscope circuit, normally receives light reflected by mirror M–1, and a considerably smaller amount of light from the second mirror system M–2, due to the normal low transmissivity of disc B. The output can also be observed by human observer H, with the aid of insertable mirror M–4.

Any laser light LL received in the instrument, which may be generated for instance by laser generated flashes of intense laser light emission LE, reflected from remote objects are attenuated by the instrument, as the interference system is particularly tuned to this light and provides maximum differential interference as to such light. However, when high intensity light of this kind is received, the transmissivity of light bleachable disc B rises; the disc becomes more transparent. More of the light incident on this disc then reaches second mirror M–2, and returns therefrom (again through B) to semireflective surface M–3. Here it is recombined with the light that returns from mirror M–1. Interference then occurs between substantially equal portions of laser light flashes, returning from M–1, and M–2 and recombined at M–3, thereby effecting substantially total cancellation in the output of the system.

In this connection it will also be understood that laser emission is of high spectral purity at a certain wavelength $\lambda$. Pursuant to proper tuning, as indicated above, substantially identical intensities of spectrally substantially identical light flashes are subjected to destructive interference, the phase of one portion differing from that of the other by exactly one-half wavelength of the specific laser emission LE. The result is that maximum energy laser light LL, reaching the instrument, produces a minimum energy light output, approaching zero in output system R, H.

Accordingly, this system sees substantially only background light BL, and any low intensity and nonperilous laser light returning for instance from objects of low reflectivity in the distance. These latter constituents, however, are fully observable, along with background light BL. In this respect the new system is distinctly superior to the laser light filtering systems of the past.

As a resume, the operation of the new system can be described as follows for the two principal conditions that it encounters, i.e., the low intensity condition of incident light and the high intensity condition of such light. Assuming in the first place that the instrument receives only light of an energy expressed as unity (1.000), semireflector M–3 reflects one-half of this light (0.500) to mirror M–1, and that compensator C attenuates this to 0.315 on a double pass, it will then be found that half of 0.315 that is, 0.1575 is transmitted into output system RH. The second half of the incident low-energy unit of light (0.500) is transmitted to, and part of it returned from, mirror M–2. Normally there is a return of substantially less than 0.315 upon a double pass through bleachable filter B. When this filter is made of RG–10 and of 40 mil thickness it transmits 0.016 out of 1.000 on a double pass, that is, 0.008 out of the incident 0.500. One-half of this 0.008 is finally reflected at M–3, so that 0.004 reaches R, H from M–2. Since the energy from M–2, as noted, is transmitted at a phase shift of one-half wavelength relative to that from M–1, its energy is deducted from the greater energy that comes from M–1. Thus the net output of the system is $(0.1575^{1/2} - ^{1/2})^2$ or about 0.112, that is, 11.2 percent of the unit input in the low intensity condition.

Referring now to the high intensity condition of the system: it may be assumed that at this time an input of 1000 units is incident on M–3, whereof 500 goes to and 315 returns from M–1 to M–3 and 157.5 to R. The other 500 goes to B, and in view of the high intensity condition of this element, instead of the former 0.016 an increased double-path transmission of 0.63 occurs. Therefore M–3 now receives 315 units from M–1 and the same amount from M–2. Again, the return from M–2 arrives with 180° phase difference, and —except for minor discrepancies caused by such factors as different reflectivities of the different mirrors, which can be additionally compensated in known ways —one-half of each return, or +157.5 and −157.5, now reaches the output system, so that the system now transmits substantially 0 percent of the 1000 units input.

The combination of reflective, semireflective and light-bleachable elements M–1, M–2, M–3, B, which characterizes this invention, may be provided conveniently and most effectively in form of a composite prismatic unit, shown in FIG. 2. This unit comprises two uniform 90° glass prisms G–1, G–2, combined to form an approximately cubical body. Each prism has, in cross section, the form of an isosceles, right-angled triangle One prism G–1 has a first mirrorized surface M–11 on one of its sides, this surface desirably having its reflectivity so adjusted as to match the loss of transmission equal to that of the bleachable element at maximum transmission. The other prism G–2 has the light bleachable material, as a layer B′ on the corresponding side. It has been found particularly effective to make this layer 40 mil thick and to place reflective surface M–12 on the exposed side of this layer. The two mirrors can be formed by evaporating a suitable dielectric onto the end surfaces of the prisms. The base diagonals or hypotenuse surfaces of the two prisms are in contact with one another, one of these surfaces having a light-splitting —and in the simplest case semi-reflective —coating M–13 thereon. In order to provide the required interference in light output 0, prism G–1 can be minutely adjusted relative to G–2, along M–13, as indicated by full and broken lines at the top and left side of the unit.

Light input LI, incident on the center of a semireflective surface M–13 and substantially fully reflected at M–11, traverses and retraverses one-half of the side length of the cube minus one quarter of λ, before it arrives at the center the second time. When light bleachable coating B′ is transparent, a substantially equal portion of the intense light, incident at this center and then returning from M–12, has traversed and retraversed exactly one-half of the side length of the cube. Thus a phase difference of $\pi 2$ or 180 degrees exists between equal light portions of wavelength λ, recombined in the center of the cube. The light output 0 then approaches or equals zero, particularly when glass of good optical quality is used for the cubes, avoiding trouble due to scattering of light.

The new unit produces these remarkable effects virtually instantaneously. The light bleachable material changes from high (typically 0.63) to low (typically 0.010) transmissivity, and back, within time cycles of fractional nanoseconds. (In fact, some of the more conventional uses of the material rely on this ability to change optical characteristics with minimum delay.) A laser flash typically reaches the peak of its energy in some fifty nanoseconds, whereas the new system "closes" (that is, becomes transparent at filter B and causes full interference at R) in times of the order of a few tenths of a nanosecond, when triggered by a high intensity light pulse. The less critical time delay needed by the new system to "open" (that is, to become low-transmissive or opaque at B and no longer to cause significant interference at R) amounts to a few nanoseconds after the high intensity of the pulse is over. A single unit of the type shown in FIG. 2 is able, as a result, to reduce the laser energy, transmitted through the system, by a major amount.

Still further reduction becomes possible by cascading such units, as shown in FIG. 3. It is only necessary to interpose light beam concentrating optics LC—for instance, as shown, a focusing lens followed by a collimating lens —between the first and second prism units P–1, P–2, in order to make sure that the output of P–1, while reduced in intensity, still is sufficient to trigger the operation of P–2.

A cascade arrangement similar to that of FIG. 3, can also be used to protect the user against lasers operating at different wavelengths, such as ruby and neodymium lasers. Light concentrating optics LC are not needed in this case.

I claim:

1. A system for transmitting light and for automatically blocking high intensity light, such as light from a laser, said system comprising: an element for splitting incident light into first and second light portions and directing the same into first and second paths, respectively; first and second reflectors for reflecting the first and second light portions back to said element and for recombining them thereby; and a light control element, disposed in one of said paths, the light transmissivity of which element rises and falls with the intensity of the light incident thereon.

2. A system as described in claim 1, including means for spacing the reflectors from the semireflector so as to tune the system to the wavelength of incident laser light.

3. A system as described in claim 1, additionally including compensator means for causing a transmission loss equal to that caused by said light control element at maximum transmissivity thereof. said compensator means being disposed in the path not including the light control element.

4. A system as described in claim 1 wherein said light control element is a disc or layer of a compound of selenium and cadmium sulfide.

5. A system as described in claim 3 wherein said light control element contains a solution of metal phthalocyanine.

6. A system as described in claim 1 wherein said light control element comprises a filter of material bleachable by light of high intensity.

7. A protective device for use in light receiving apparatus, said device comprising a pair of right angle prisms, each having a pair of perpendicular faces and a hypotenuse face, said prisms being mirrorized on said perpendicular faces, and substantially joined along said hypotenuse faces, each of the latter faces being semireflective, and a light bleachable filter between said hypotenuse faces of said prisms and one of said perpendicular faces.

8. A device as described in claim 7 including an additional pair of prisms similar to the described pair and cascaded therewith.

9. A device as described in claim 8, also including means for focusing and then collimating the light output of the first pair of prisms before applying it to the additional pair of prisms.

10. A device as described in claim 8, wherein one of said pairs of prisms is optically tunable to one laser frequency, and the other pair of prisms, to another laser frequency.